US012704198B2

(12) United States Patent
Steltner et al.

(10) Patent No.: US 12,704,198 B2
(45) Date of Patent: Aug. 11, 2026

(54) DIAGNOSTIC METHOD, DIAGNOSTIC DEVICE AND PROCESS VALVE ASSEMBLY

(71) Applicant: Festo SE & Co. KG, Esslingen (DE)

(72) Inventors: Holger Steltner, Esslingen (DE); Fabian Wiek, Korntal-Münchingen (DE)

(73) Assignee: Festo SE & Co. KG, Esslingen (DE)

( * ) Notice: Subject to any disclaimer, the term of this patent is extended or adjusted under 35 U.S.C. 154(b) by 118 days.

(21) Appl. No.: 18/450,057

(22) Filed: Aug. 15, 2023

(65) Prior Publication Data

US 2024/0060574 A1 Feb. 22, 2024

(30) Foreign Application Priority Data

Aug. 16, 2022 (DE) ..................... 10 2022 120 650.5

(51) Int. Cl.
*F16K 37/00* (2006.01)

(52) U.S. Cl.
CPC ................................ *F16K 37/0083* (2013.01)

(58) Field of Classification Search
CPC ............. F16K 37/0083; F16K 37/0033; F16K 31/1635; F16K 1/221; F16K 37/0041; F16K 1/18; F16K 15/03; F16K 37/0075; G01M 13/00; G01M 13/003; G01B 7/003; G01B 7/02
USPC ................. 137/553, 554, 556; 251/305–308; 73/168, 761, 865.3, 865.9
See application file for complete search history.

(56) References Cited

U.S. PATENT DOCUMENTS 5,008,841 A 4/1991 McElroy
5,819,330 A * 10/1998 Yokel ..................... E03D 1/306 4/414
2019/0293205 A1 9/2019 Huck
2019/0310157 A1 10/2019 Reich et al.
2020/0096132 A1 3/2020 Fassbender et al.
2021/0373525 A1 12/2021 Bech et al.
2022/0065362 A1 3/2022 Weigand et al.

FOREIGN PATENT DOCUMENTS

DE 690 16 297 T2 7/1995
DE 10 2015 210 716 12/2016
DE 10 2018 216 338 3/2020
DE 10 2020 114 408 12/2021
EP 3 546 763 10/2019
KR 100943818 2/2010
WO 2021/233941 11/2021

OTHER PUBLICATIONS

Examination Report issued in corresponding German Patent Application No. 10 2022 120 650.5, Mar. 17, 2023, 6 pages.
Office Action issued in corresponding Finnish Patent Application No. 20235876, filed Feb. 20, 2024, 9 pages.

* cited by examiner

*Primary Examiner* — Robert R Raevis
(74) *Attorney, Agent, or Firm* — HSML P.C.

(57) ABSTRACT

A diagnostic method for determining a flap impact of a flap fitting of a process valve, including the steps of: recording a temporal deflection course of a flap of the flap fitting, and detecting a flap impact characteristic in the temporal deflection course.

17 Claims, 3 Drawing Sheets

DIAGNOSTIC METHOD, DIAGNOSTIC DEVICE AND PROCESS VALVE ASSEMBLY

This application claims priority to German application 10 2022 120 650.5, filed Aug. 16, 2023, which is incorporated by reference.

The invention relates to a diagnostic method for determining a butterfly valve impact of a butterfly valve fitting of a process valve.

DE 10 2015 210 716 A1 describes a position sensor with a processing device configured to determine motion profiles by linking a plurality of sensor signals, and to compare determined motion profiles with stored motion profiles to determine a state value.

SUMMARY OF THE INVENTION

It is an object of the invention to provide a simple and reliable diagnostic method.

The object is solved by the diagnostic method according to claim 1. The diagnostic method comprises the steps of: recording a temporal deflection course of a butterfly valve of the butterfly valve fitting, and detecting a butterfly valve impact characteristic in the temporal deflection course. Optionally, the diagnostic method comprises the step of: based on the detected butterfly valve impact characteristic, generating butterfly valve impact information indicating that butterfly valve impact is present. The temporal deflection course may also be referred to as temporal deflection course.

The term "butterfly valve impact" is intended to refer to a movement of the butterfly valve of the butterfly valve fitting that occurs over a predetermined portion (e.g., at least 50%) of the stroke of the butterfly valve and is performed at at least a predetermined speed, and preferably occurs to an end position of the butterfly valve. For example, during a butterfly valve impact, the butterfly valve slams against a stop defining the end position. The butterfly valve impact may also be referred to as butterfly valve slam. A butterfly valve impact can lead to damage of the butterfly valve fitting. The method according to the invention makes it possible to detect a butterfly valve impact. It thus becomes possible, for example, to react to the butterfly valve impact and thereby reduce the risk of damage to the butterfly valve fitting. Expediently, in the diagnostic method, no comparison of the deflection course with a stored motion profile is carried out and/or no derivation, in particular no numerical derivation, of the deflection course is formed.

The invention also relates to a diagnostic device for determining a butterfly valve impact of a butterfly valve fitting of a process valve, the diagnostic device being configured to record a temporal deflection course of a butterfly valve of the butterfly valve fitting and to detect a butterfly valve impact characteristic in the temporal deflection course. Optionally, the diagnostic device is configured to generate butterfly valve impact information based on the detected butterfly valve impact characteristic indicating that butterfly valve impact is present.

The invention further relates to a process valve assembly comprising a process valve with a butterfly valve fitting and a valve drive for driving the butterfly valve fitting, further comprising the diagnostic device, which is embodied as a sensor box attached externally to the valve drive.

BRIEF DESCRIPTION OF THE DRAWINGS

Further exemplary details as well as exemplary embodiments are explained below with reference to the figures. Thereby shows FIG. 1 a system with a diagnostic device, a valve drive and a butterfly valve fitting, FIG. 2 a diagram with temporal deflection courses of a butterfly valve of the butterfly valve fitting, and FIG. 3 a flow chart of a diagnostic method.

DETAILED DESCRIPTION OF THE INVENTION

Figure 1:
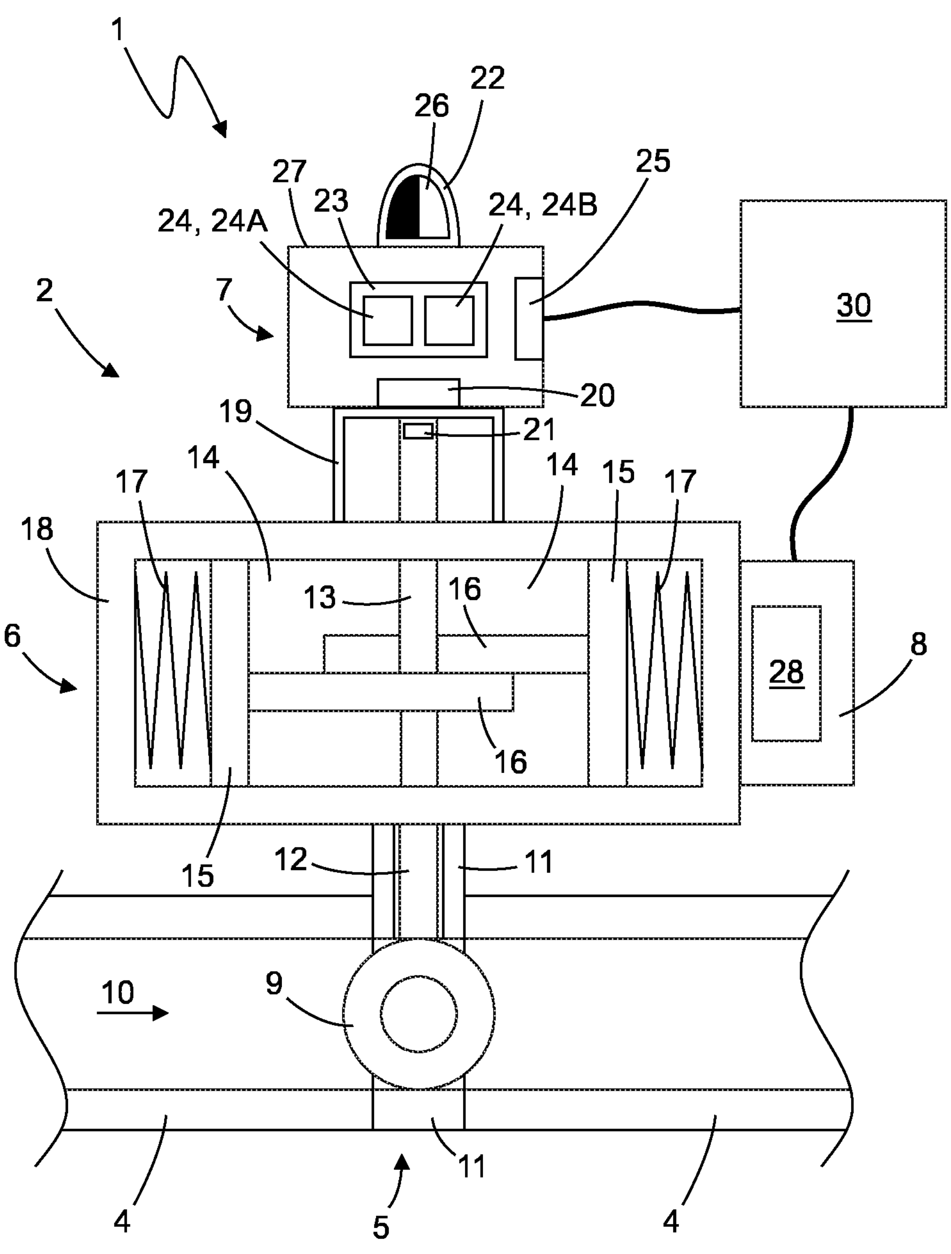

FIG. 1 shows a system 1 comprising a process valve assembly 2, a higher-level controller 30, and expediently a pipe arrangement 4. The higher-level controller 30 is, for example, a programmable logic controller, PLC. Preferably, the system is a process automation system. For example, the system 1 is an industrial system, for example an industrial process automation system.

The process valve assembly 2 comprises a butterfly valve fitting 5, a valve drive 6 and a diagnostic device 7. Preferably, the process valve assembly 2 further comprises a valve device 8, in particular embodied as a valve module. The assembly formed by the valve drive 6 and the butterfly valve fitting 5 shall also be referred to as a process valve.

Exemplarily, the butterfly valve fitting 5 is arranged between two sections of the pipe arrangement 4 and serves to influence a flow 10 of a process fluid flowing through the pipe arrangement 4, in particular to selectively block or release it. The butterfly valve fitting 5 has a butterfly valve 9, which expediently serves to influence the flow 10 of the process fluid. The butterfly valve 9 serves as a valve member of the process valve. The butterfly valve fitting 5 may also be referred to as the butterfly valve.

The butterfly valve 9 is displaceable into different deflections in order to influence the flow of the process fluid differently. By the term "deflection" is meant in particular a position, preferably an angular position, of the butterfly valve 9.

The butterfly valve 9 is expediently displaceable into a first deflection, which represents, for example, a first end position in which the butterfly valve 9 completely—i.e. maximally—releases the flow 10 of the process fluid. This state is shown in FIG. 1. The butterfly valve 9 is further displaceable into a second deflection, in particular a second end position, in which the butterfly valve 9 blocks the flow 10 of the process fluid—i.e. stops it completely. The butterfly valve 9 can be displaced from one to the other of these two deflections by a rotational movement.

Exemplarily, the butterfly valve 9 is disk-shaped and is expediently mounted for rotational movement about an axis of rotation aligned parallel to its disk plane. The butterfly valve fitting 5 has a fitting housing 11, with respect to which the butterfly valve 9 is rotatably mounted. The butterfly valve fitting 5 is attached to the pipe arrangement 4 by the fitting housing 11. The butterfly valve fitting 5 further has a butterfly valve fitting drive shaft 12 to which the butterfly valve 9 is attached. Via the butterfly valve fitting drive shaft 12, the butterfly valve 9 can be set in a rotational movement by the valve drive 6 in order to adjust the deflection of the butterfly valve 9.

By way of example, the valve drive 6 is designed as a pneumatic valve drive, in particular as a rotary drive. Purely by way of example, the valve drive 6 is designed as a single-acting valve drive.

The valve drive 6 has a drive element 13, exemplarily designed as a drive shaft, which is coupled to the butterfly valve 9—exemplarily via the butterfly valve fitting drive shaft 12. The valve drive 6 also has a first pressure chamber 14, as well as a piston arrangement 15, which can be set in motion by pressurizing the first pressure chamber 14 with compressed air. The piston arrangement 15 is coupled to the drive element 13, so that a movement of the piston arrangement 15 is converted into a movement of the drive element 13. Exemplarily, the piston arrangement 15 has coupling sections 16 that engage with the drive element 13 and, for example, form a pinion drive together with the drive element 13. The coupling sections 16 are designed, for example, as toothed racks which are in engagement with a pinion arranged on the drive element 13 in order to convert a linear movement of the coupling sections 16 into a rotary movement of the drive element 13.

The valve drive 6 further includes a spring arrangement 17 supported on the piston arrangement 15, the spring arrangement 17 providing a spring force to counteract a first pneumatic force caused by compressed air pressurization of the first pressure chamber 14.

The valve drive 6 further comprises a valve drive housing 18 in which the first pressure chamber 14, the piston arrangement 15, the spring arrangement 17 (if present) and the drive element 13 are arranged, in particular at least partially. The butterfly valve fitting 5 is attached by its fitting housing 11 to the outside of the valve drive housing 18.

According to an alternative embodiment (not shown), the valve drive is designed as a double-acting valve drive. In this alternative embodiment, the valve drive 6 does not have a spring arrangement 17 and expediently has a second pressure chamber that can be pressurized with compressed air. By applying compressed air to the second pressure chamber, a second pneumatic force can be provided which counteracts the first pneumatic force.

The diagnostic device 7 is exemplarily designed as a sensor box. The diagnostic device 7 is, for example, a limit switch attachment (which may also be referred to as end switch attachment). The diagnostic device 7 is expediently attached to the outside of the valve drive housing 18. Exemplarily, the diagnostic device 7 has a mounting bridge 19 with which the diagnostic device 7 is attached to the valve drive housing 18. In an exemplary embodiment, the diagnostic device 7 has a deflection sensor 20 that is used to detect a deflection of the butterfly valve 9. Exemplarily, the diagnostic device 7 detects the deflection of the butterfly valve 9 indirectly—namely, by the diagnostic device 7 using the deflection sensor 20 to detect the deflection of the drive element 13 with which the butterfly valve 9 co-rotates. Exemplarily, the deflection sensor 20 is designed as a magnetic sensor that detects a magnetic field provided by a magnet 21 that is coupled to the drive element 13 in a rotationally fixed manner and thus rotates with the drive element 13 (and thus with the butterfly valve 9).

In a purely exemplary manner, the diagnostic device 7 has a visual position indicator 22 which is expediently arranged on the outside of the diagnostic device 7 and visually indicates the current deflection of the butterfly valve 9. In an exemplary embodiment, the position indicator 22 comprises a position indicator element 26 which is preferably coupled to the drive element 13 in a rotationally fixed manner so that it rotates with the drive element 13, and which comprises a visual mark whose rotational position is visually detectable by a user.

The diagnostic device 7 further comprises a computer unit 23, which is for example implemented as a microprocessor. The computer unit 23 has at least one buffer 24, which is designed in particular as a ring buffer. By the term "ring buffer" is meant a memory which expediently has a fixed memory size and in which, when the memory (i.e. the ring buffer) is full, the respective oldest value in the ring buffer is discarded in order to make room for the newest value to be recorded in the ring buffer, for example by overwriting the respective oldest value with the newest value, or by shifting all values contained in the ring memory by one memory position, so that the oldest value is removed from the ring memory, all other values (i.e. the second oldest value up to the youngest value) are retained in the ring memory at a respective new memory position, and a memory position becomes free where the hitherto youngest value was stored, into which the newest value can be written.

Exemplarily, the computer unit 23 has a first buffer 24A, which is designed in particular as a first ring buffer, and a second buffer 24B, which is designed in particular as a second ring buffer. The buffer 24, in particular the first buffer 24A and/or the second buffer 24B, is expediently implemented by means of software. The buffer 24, in particular the first buffer 24A and/or the second buffer 24B, is implemented, for example, by a memory area of a (volatile or non-volatile) memory of the computer unit 23.

Preferably, the diagnostic device 7 further comprises a communication interface 25, which is implemented, for example, as a bus interface. Preferably, the communication interface 25 is implemented as an I/O link interface, HART interface or Profibus interface. Exemplarily, the diagnostic device 7 is communicatively connected to the higher-level controller 30 via the communication interface 25, for example in order to transmit a deflection of the butterfly valve 9 detected by the deflection sensor 20 to the higher-level controller 30 and/or in order to transmit butterfly valve impact information to the higher-level controller 30.

The diagnostic device 7 has a diagnostic device housing 27, in which the deflection sensor and the computer unit 23 are expediently arranged. The communication interface 25 and the (optional) mounting bridge 19 and visual position indicator 22 are expediently arranged on the outside of the diagnostic device housing 27.

In an exemplary embodiment, the valve device 8 is externally mounted to the valve drive housing 18. The valve device 8 has a valve arrangement 28 having at least one valve, via which the first pressure chamber 14 (and, if present, the second pressure chamber) of the valve drive 6 can be supplied with compressed air and/or via which compressed air can be discharged from the first pressure chamber 14 and/or the second pressure chamber. The valve arrangement 28 comprises, for example, at least one solenoid valve. Exemplarily, the valve device 8 is communicatively connected to the higher-level controller 30 to receive a (particularly electrical) control signal for controlling the valve arrangement 28 to cause, for example, the butterfly valve 9 to be moved from one end position to the other end position.

Figure 2:
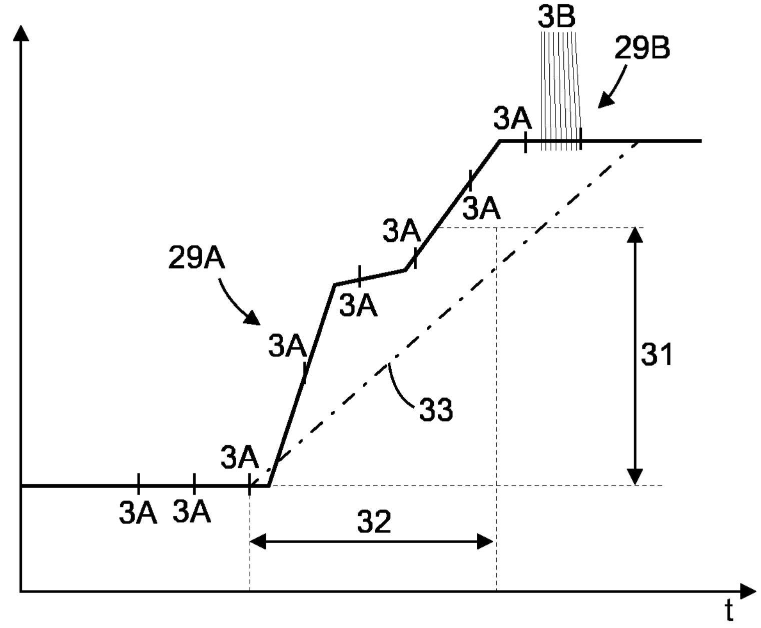
Figure 3:
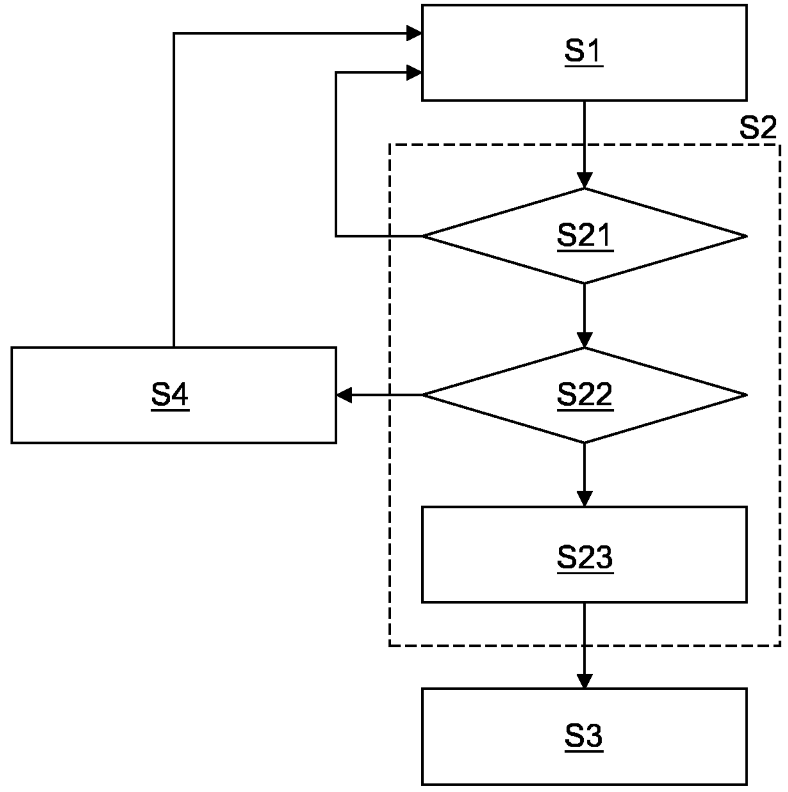

With reference to FIGS. 2 and 3, a diagnostic method for determining a butterfly valve impact of the butterfly valve fitting 5 of the process valve will be explained below. A butterfly valve impact occurs, for example, when the hydrodynamic forces acting on the butterfly valve, starting from a certain deflection of the butterfly valve, cause the butterfly valve to be suddenly rotated with a large torque into an end position, for example the open position. Furthermore, a butterfly valve impact can occur if, due to deposits or hardening on a butterfly valve seal of the butterfly valve fitting 5, a breakaway torque of the butterfly valve 9 is greatly increased and far exceeds the frictional torques occurring during the movement. Butterfly valve impact is particularly prevalent when the butterfly valve 9 is moved at an increased speed over a large portion of the stroke. A short, rapid movement of the butterfly valve 9, such as occurs several times in a stick-slip effect, does not constitute a butterfly valve impact and is expediently not detected as a butterfly valve impact by the diagnostic method.

FIG. 3 shows a flow chart of the diagnostic method. FIG. 2 shows a diagram of a temporal deflection course 29A recorded in the diagnostic method. In the diagram of FIG. 2, time is plotted on the horizontal axis and the deflection of the butterfly valve 9 is plotted on the vertical axis.

Expediently, the diagnostic method is performed in an operation of the process valve assembly 2, in which operation the butterfly valve 9 is moved (by a control of the valve device 8) from one end position to another end position.

The diagnostic method comprises a first step S1, in which a temporal deflection course 29A of the butterfly valve 9 of the butterfly valve fitting 5 is recorded, for example by the diagnostic device 7, in particular into the buffer 24. Preferably, the recording of the temporal deflection course 29A is performed into a ring buffer, in particular of the diagnostic device 7. The temporal deflection course 29A comprises a plurality of deflection values 3A, which each represent a respective deflection of the butterfly valve 9 recorded at a respective time. Exemplarily, there is the same time interval between (in particular all) two temporally successive deflection values 3A. Preferably, the deflection values 3A are acquired cyclically, in particular with a fixed sampling rate, for example with a cycle time in the millisecond range. Preferably, the diagnostic device 7 is configured to continuously record the deflection course, in particular to continuously update it, in that the diagnostic device 7 preferably continuously records new deflection values, in particular during the entire operation of the diagnostic device 7.

Exemplarily, the butterfly valve 9 performs a movement while the temporal deflection course 29A is recorded, in particular a movement from one end position to the other end position. This movement is represented by the recorded deflection course 29A.

The diagnostic method comprises a second step S2, in which a butterfly valve impact characteristic is detected in the temporal deflection course, in particular by the diagnostic device 7, for example by the computer unit 23. Preferably, for detecting the butterfly valve impact characteristic, it is determined whether the butterfly valve 9 has passed through a deflection difference greater than a predetermined deflection difference threshold 31, and the time duration is determined which the butterfly valve 9 has required to pass through the deflection difference greater than the predetermined deflection difference threshold 31. Preferably, detecting the butterfly valve impact characteristic is based on a predetermined time duration threshold 32. For example, for detecting the butterfly valve impact characteristic, the time duration is compared to the predetermined time duration threshold 32. Preferably, the butterfly valve impact characteristic comprises passing (the butterfly valve 9) through a deflection difference greater than a predetermined deflection difference threshold 31 and determining the time duration required therefor. Preferably, the butterfly valve impact characteristic comprises a passing (of the butterfly valve 9) through a deflection difference greater than a predetermined deflection difference threshold 31 within a time duration less than a predetermined time duration threshold 32. For example, the deflection difference threshold value is at least 50%, at least 60%, at least 70%, or at least 80% of the maximum stroke of the butterfly valve 9. Expediently, the maximum stroke is the deflection difference from the first end position to the second end position of the butterfly valve 9.

Preferably, the diagnostic device 7 checks whether there are two deflection values 3A in the detected temporal deflection course 29A between which two deflection values 3A there is a deflection difference that is greater than the deflection difference threshold 31. In this case, the time duration required for this is preferably calculated from the time interval between the two deflection values and the butterfly valve impact characteristic is thus detected. Subsequently, the butterfly valve impact characteristic is checked using a time duration threshold 32 to determine whether the change in deflection has occurred too quickly. If this is the case, then the diagnostic device 7 determines that the deflection course 29A shows indication of a butterfly valve impact. If this is not the case, then the diagnostic device 7 expediently determines that the deflection course 29A does not exhibit indication of a butterfly valve impact.

Optionally, the diagnostic device 7 checks whether there are two deflection values 3A in the detected temporal deflection course 29A between which there is a deflection difference greater than the deflection difference threshold 31 and whose temporal distance from each other is smaller than the duration threshold 32. If this is the case, then the diagnostic device 7 determines that the deflection course 29A exhibits the butterfly valve impact characteristic. If this is not the case, then the diagnostic device 7 suitably determines that the deflection course 29A does not have the butterfly valve impact characteristic.

In the example shown in FIG. 2, the deflection course 29A exhibits indication of butterfly valve impact. Optionally, the deflection course 29A exhibits the butterfly valve impact characteristic. For example, the deflection difference between the third deflection value 3A and the seventh deflection value 3A is greater than the deflection difference threshold 31, and the time interval between this third deflection value 3A and the seventh deflection value 3A is less than the time duration threshold 32.

FIG. 2 further shows a deflection course 33 which has no indication of butterfly valve impact, in particular no butterfly valve impact characteristic. Thus, in the deflection course 33, the deflection difference threshold 31 is not exceeded until the duration threshold 32 has already been exceeded.

Preferably, for detecting the butterfly valve impact characteristic, it is checked for each newly recorded deflection value 3A of the time duration deflection course 29A, whether the deflection course 29A includes a previously recorded deflection value 3A for which the deflection difference from the respective newly recorded deflection value 3A is greater than or equal to the predetermined deflection difference threshold 31. This is done, for example, in a step S21 (which is part of step S2). If it is determined in step S21 that the deflection course 29 does not include a previously recorded deflection value 3A for which the deflection difference with respect to the respective newly recorded deflection value 3A is greater than or equal to the predetermined deflection difference threshold 31, then the method aborts step S2—that is, the detection of the butterfly valve impact characteristic—and returns to step S1 in which the deflection course is further recorded. Expediently, step S21 is performed for each newly recorded deflection value 3A.

If it is determined at step S21 that the deflection course 29 includes a previously recorded deflection value 3A for which the deflection difference from the respective newly recorded deflection value 3A is greater than or equal to the predetermined deflection difference threshold 31, then the method proceeds to step S22 (which is part of step S2). Expediently, in step S22, the time duration between the newly recorded deflection value 3A and the previously recorded deflection value is calculated. In step S22, it is checked whether the time duration between the newly recorded deflection value 3A and the previously recorded deflection value 3A is less than the time duration threshold 32. Alternatively or additionally, it may be checked whether a slope calculated based on the deflection difference and the time duration is greater than or equal to a predetermined slope threshold. Unless the time duration is less than the time duration threshold 32 or the slope is greater than or equal to the slope threshold, the method proceeds to step S23 (which is part of step S2) in which it is determined that there is indication of butterfly valve impact, particularly the butterfly valve impact characteristic. Unless the time duration is less than the time duration threshold 32 or the slope is greater than or equal to the slope threshold, the method proceeds to step S4, in which it is determined that there is no indication of butterfly valve impact, in particular no butterfly valve impact characteristic. The method then expediently returns to step S1, in which the deflection course 29A is further recorded. The diagnostic method comprises a third step S3 in which, based on the detected indication of butterfly valve impact, in particular based on the butterfly valve impact characteristic, butterfly valve impact information is generated indicating that butterfly valve impact is present. The third step S3 follows, in particular, the step S23. The butterfly valve impact information is expediently generated by the diagnostic device 7 and is transmitted, for example, to the higher-level controller 30. The butterfly valve impact information indicating that a butterfly valve impact is present shall also be referred to as the first butterfly valve impact information. Optionally, the first butterfly valve impact information has further detailed information, for example from the evaluated deflection course and/or the butterfly valve impact characteristic, for example the determined time duration and/or deflection difference and/or their ratios to the respective threshold values.

In response to the first butterfly valve impact information being provided, for example, a warning may be issued, in particular by the diagnostic device 7 and/or the higher-level controller 30. The warning is, for example, a wear warning. Further, an emergency stop of a system comprising the process valve assembly 2 may occur in response to the first butterfly valve impact information. Further, the diagnostic device 7 and/or the higher-level controller may generate predictive maintenance information, such as an estimate for a remaining life duration, and/or calculate a maintenance date based on the first butterfly valve impact information. Furthermore, the higher-level controller 30 may be configured to adjust a control of the valve device 8 based on the first butterfly valve impact information, in particular such that the butterfly valve impact is reduced or eliminated.

Optionally, in step S4, a second butterfly valve impact information is generated which indicates that there is no butterfly valve impact. Optionally, the second butterfly valve impact information is transmitted to the higher-level controller 30. Optionally, the second butterfly valve impact information comprises further detailed information, for example from the evaluated deflection course, for example the determined time duration and/or deflection difference and/or their ratios to the respective threshold values.

The diagnostic method is expediently carried out by the diagnostic device 7. Preferably, the diagnostic device 7 is used to determine the butterfly valve impact of the butterfly valve fitting 5 of the process valve. Preferably, the diagnostic device 7 is adapted to record the temporal deflection course 29A of the butterfly valve 9 of the butterfly valve fitting 5, to detect the butterfly valve impact characteristic in the temporal deflection course 29A, and to generate the butterfly valve impact information indicating that a butterfly valve impact is present based on the detected butterfly valve impact characteristic.

Preferably, the predetermined deflection difference threshold 31 is provided by a user or is determined based on a user input, for example, by the diagnostic device 7. For example, a user device is provided into which the user can input the predetermined deflection difference threshold 31 and by means of which the inputted deflection difference threshold 31 can be transmitted to the diagnostic device 7. Further, the diagnostic device may have a human machine interface by means of which a user may input the predetermined deflection difference threshold value directly to the diagnostic device.

Preferably, the sampling rate for recording the temporal deflection course 29A is determined based on the duration threshold 32, for example by the diagnostic device 7. The sampling rate determines how many deflection values 3A are recorded for the deflection course 29A per time unit, and thus determines in particular the temporal distance between temporally adjacent deflection values 3A. Expediently, the deflection course 29A is recorded in the buffer 24 (in particular designed as a ring buffer), which expediently has a fixed memory size so that only a predetermined number of deflection values 3A can be held in the buffer 24. The sampling rate is expediently selected such that (when the buffer 24 is full) the difference in time between the oldest deflection value 3A of the deflection course 29A held in the buffer 24 and the most recent deflection value 3A of the deflection course 29A held in the buffer 24 is greater than the duration threshold 32.

Preferably, the duration threshold 32 is determined based on one or more application-specific characteristics. The application-specific characteristics may comprise, for example, information about the pressure conditions of the process fluid, and/or dimensions, in particular a nominal width, of the butterfly valve fitting 5. Preferably, the duration threshold 32 is determined on the basis of a dimension, in particular a nominal width, of the butterfly valve fitting 5, for example by the diagnostic device 7. The characteristics may be entered, for example, by a user and/or are provided by the diagnostic device 7 and/or the higher-level controller 30, for example on the basis of identification information identifying the butterfly valve fitting 5. For example, the dimension can be entered by a user and/or is provided by the diagnostic device 7 and/or the higher-level controller 30, for example on the basis of identification information identifying the butterfly valve fitting 5. Expediently, a larger duration threshold 32 is determined for a larger dimension, in particular a larger nominal size, than for a smaller dimension, in particular a smaller nominal size.

Preferably, the duration threshold 32 is predetermined by a user or determined based on user input, for example by the diagnostic device 7. For example, a user device is provided into which the user can input the predetermined duration threshold 32 and by means of which the input duration threshold 32 can be transmitted to the diagnostic device 7. Further, the diagnostic device 7 may have a human machine interface by means of which a user may input the predetermined duration threshold 32 directly to the diagnostic device 7.

Preferably, the diagnostic device 7 is implemented as a sensor box. In particular, the recording of the temporal deflection course 29A, the detection of the butterfly valve impact characteristic, and the generation of the butterfly valve impact information are performed by a sensor box externally attached to the valve drive 6 used to actuate the butterfly valve fitting 5.

Preferably, in the diagnostic method, a plurality of temporal deflection courses 29A, 29B are recorded in parallel, each of which represent the deflection of the butterfly valve 9, wherein each deflection course 29A, 29B is recorded into a respective buffer 24 (of the diagnostic device 7), in particular a respective circular buffer, and wherein each deflection course 29A, 29B is recorded at a different sampling rate. Exemplarily, the deflection courses comprise a first temporal deflection course 29A recorded into the first buffer 24A and a second deflection course 29B recorded into the second buffer 24B. The first deflection course 29A comprises first deflection values 3A and the second deflection course 29B comprises second deflection values 3B. Exemplarily, both deflection courses 29A, 29B have the same number of deflection values. The second deflection course 29B expediently covers a shorter period of time than the first deflection course 29A. Exemplarily, the sampling rate of the second deflection course 29B is greater than the sampling rate of the first deflection course 29A.

By recording multiple deflection courses in parallel at different sampling rates, the diagnostic device 7 can detect butterfly valve impact for different butterfly valve fittings so that the diagnostic device 7 can be used with different butterfly valve fittings. In the example shown in FIG. 2, the second deflection course 29B is not suitable for detecting butterfly valve impact for the present butterfly valve fitting 5 because this second deflection course 29B covers too small a time range for the present butterfly valve fitting 5 due to the higher sampling rate (and the limited number of deflection values in the buffer 24B). This second deflection course 29B can be used for a butterfly valve fitting where the damper moves from a first end position to a second end position in a shorter time, and where the higher sampling rate of the second deflection course 29B is needed to represent the movement of the butterfly valve with enough deflection values to be able to detect the damper flapping.

Preferably, one temporal deflection course is selected among the plurality of temporal deflection courses (for example, by the diagnostic device 7) to detect the butterfly valve impact characteristic in the selected temporal deflection course. Preferably, step S2 is performed for the selected deflection course and, in particular, not for a non-selected deflection course. Exemplarily, the temporal deflection course (in which the butterfly valve impact characteristic is detected) is selected based on the duration threshold 32.

Alternatively, each of the temporal deflection courses 29A, 29B is checked to determine whether indication of butterfly valve impact, for example a butterfly valve impact characteristic, are included, for example by the diagnostic device 7. For example, step S2 is performed for each of the deflection courses 29A, 29B, in particular in parallel. In response to the butterfly valve impact characteristic being indicative of butterfly valve impact in at least one of the deflection courses 29A, 29B, the first butterfly valve impact information may then be provided. For example, in response to detecting the butterfly valve impact characteristic in at least one of the deflection courses 29A, 29B, the first butterfly valve impact information is provided.

The invention claimed is:

1. A diagnostic method for detecting a butterfly disk impact characteristic of a butterfly valve Swing of a process valve, comprising the steps of: recording a temporal angular position course of a butterfly disk of the butterfly valve and detecting a butterfly disk impact characteristic in the temporal angular position course, wherein the temporal angular position course comprises a plurality of angular position values, which each represent a respective angular position of the butterfly disk recorded at a respective time, further comprising the step of: based on the detected butterfly disk impact characteristic, generating a butterfly disk impact information indicating that a butterfly disk impact is present, wherein the butterfly disk impact is a movement of fly disk that occurs over predetermined portion of a stroke of the butterfly disk and is performed at at least a predetermined speed, so that the butterfly disk slams against a stop defining an end position of the butterfly disk, wherein for detecting the butterfly disk impact characteristic, it is determined whether the butterfly disk has passed through an angular position difference greater than a predetermined angular position difference threshold, and a time period which the valve has taken to pass through the angular position difference greater than the predetermined angular position difference threshold is determined.

2. The diagnostic method according to claim 1, wherein the detection of the butterfly disk impact characteristic is based on a predetermined time duration threshold.

3. The diagnostic method according to claim 1, wherein the predetermined angular position difference threshold is at least 50%, at least 60%, at least 70% or at least 80% of a maximum stroke of the butterfly disk.

4. The diagnostic method according to claim 1, wherein the predetermined angular position difference threshold is specified by a user or is determined based on a user input.

5. The diagnostic method according to claim 4, wherein a sampling rate for recording the temporal angular position course is determined based on a predetermined time duration threshold.

6. The diagnostic method according to claim 5, wherein the time duration threshold is determined on the basis of an application-specific parameter of the butterfly valve.

7. The diagnostic method according to claim 5, wherein the time duration threshold is specified by a user or is determined on the basis of a user input.

8. The diagnostic method according to claim 1, wherein recording the temporal angular position course, detecting the butterfly disk impact characteristic, and generating the butterfly disk impact information is performed by a diagnostic device externally attached to a valve drive used to drive the butterfly valve.

9. The diagnostic method according to claim 1, wherein, in detecting the butterfly disk impact characteristic, for each newly recorded angular position value of the temporal angular position course, it is checked whether the angular position course includes a previously recorded angular position value for which an angular position difference from the respective newly recorded angular position value is greater than or equal to a predetermined angular position difference threshold, and, if so, it is checked whether a time duration between this newly recorded angular position value and the previously recorded angular position value is less than a time duration threshold, or whether a slope calculated on the basis of the angular position difference and the time duration is greater than or equal to a predetermined slope threshold.

10. The diagnostic method according to claim 1, wherein the recording of the temporal angular position course is done into a ring memory.

11. The diagnostic method according to claim 1, wherein a plurality of temporal angular position courses are recorded in parallel, each representing the angular position of the butterfly disk, wherein each angular position course is recorded into a respective buffer, and wherein each angular position course is recorded at a different sampling rate.

12. The diagnostic method according to claim 11, wherein a temporal angular position course is selected among the plurality of temporal angular position courses to detect the butterfly disk impact characteristic in the selected temporal angular position course.

13. The diagnostic method according to claim 12, wherein the detection of the butterfly disk impact characteristic is based on a predetermined time duration threshold, wherein the temporal angular position course is selected based on the duration threshold.

14. The diagnostic method according to claim 11, wherein each of the temporal angular position courses is checked to determine whether a butterfly disk impact characteristic is included.

15. A diagnostic device for detecting a butterfly disk impact of a butterfly valve of a process valve, wherein the diagnostic device is configured to record a temporal angular position course of a butterfly disk of the butterfly valve and to detect a butterfly disk impact characteristic in the temporal angular position course, wherein the ter poral angular position course comprises a plurality of angular position values, which each represent a respective angular position of the butterfly disk recorded at a respective time, wherein the diagnostic device is configured to generate, based on the detected butterfly disk impact characteristic, butterfly disk impact information indicating that the butterfly disk impact is present wherein the butterfly disk impact is a movement of the butterfly disk that occurs over a predetermined portion of a stroke of the butterfly disk and is performed at at least a predetermined speed, so that the butterfly disk slams against a stop defining an end position of the butterfly disk, wherein the diagnostic device comprises a ring memory and is configured to record the temporal angular position course into the ring memory.

16. The diagnostic device according to claim 15, wherein the diagnostic device has a mounting bridge for attaching the diagnostic device to a valve drive housing.

17. A process valve assembly, comprising a process valve with a butterfly valve and a valve drive for driving the butterfly valve, further comprising a diagnostic device for detecting a butterfly disk impact of the butterfly valve Sitting, wherein the diagnostic device is attached externally to the valve drive, wherein the diagnostic device is configured to record a temporal angular position course of a butterfly disk of the butterfly valve and to detect a butterfly disk impact characteristic in the temporal angular position course, wherein the temporal angular position course comprise plurality of angular position values, which each represent a respective angular position of the butterfly disk recorded at a respective time, wherein the diagnostic device is configured to generate, based on the detected butterfly disk impact characteristic butterfly disk impact information indicating that a butterfly disk impact is present, wherein the butterfly disk impact is a movement of the butterfly disk that occurs over a predetermined portion of a stroke of the butterfly disk and is performed at at least a predetermined speed, so that the butterfly disk slams against a stop defining an end position of the butterfly disk.

* * * * *